United States Patent [19]
Knopf

[11] 4,083,704
[45] Apr. 11, 1978

[54] DEVICE FOR THE SEPARATION OF THE CLEANING AGENT FROM THE EXHAUST AIR OF DRY CLEANING MACHINES

[76] Inventor: Hans Knopf, Holzheimer Weg 113, Neuss, Germany

[21] Appl. No.: 710,430

[22] Filed: Aug. 2, 1976

[30] Foreign Application Priority Data

Sep. 1, 1975 Germany ................. 7527619[U]
Mar. 16, 1976 Germany ................. 2611070

[51] Int. Cl.[2] ........................................ B01D 47/10
[52] U.S. Cl. ........................... 55/237; 55/255; 55/259; 55/314; 55/385 R; 68/18 R
[58] Field of Search ............... 55/255, 256, 257 C, 55/259, 312, 314, 316, 385 R, 419, 244, 309, 235, 237; 68/18 R, 18 C, 18 F

[56] References Cited
U.S. PATENT DOCUMENTS

| | | | |
|---|---|---|---|
| 1,001,094 | 8/1911 | Torchiani | 55/255 |
| 1,223,684 | 4/1917 | Fleming | 55/256 |
| 3,274,755 | 9/1966 | Montagnon et al. | 55/316 |

FOREIGN PATENT DOCUMENTS 2,011,300 11/1971 Germany ................. 68/18 R

*Primary Examiner*—Frank W. Lutter
*Assistant Examiner*—David L. Lacey
*Attorney, Agent, or Firm*—Kenway & Jenney

[57] ABSTRACT

A dry cleaning machine has a purifier bypass conduit and an associated control valve connected between an air exhaust line of the dry cleaning machine and an outlet line leading to atmosphere through an end filter. The outlet end of the air exhaust line is immersed in cooled water held in a closed vessel of a purifier apparatus and the outlet line is in direct fluid communication with the purifier at a point above the water. During opening and ventilation of the dry cleaning machine, the control valve is opened to provide a low pressure fluid flow path that bypasses the purifier. In one embodiment several exhaust lines, each connected to a separate dry cleaning machine, are immersed in a common purifier. Control valves in the bypass conduits connected between each air exhaust line and the outlet line together with adjustments in the vertical displacement of each exhaust conduit to change its immersion depth in the water accommodate variations in the size and operating cycles of each machine.

5 Claims, 2 Drawing Figures

DEVICE FOR THE SEPARATION OF THE CLEANING AGENT FROM THE EXHAUST AIR OF DRY CLEANING MACHINES

BACKGROUND OF THE INVENTION

This invention relates in general to dry cleaning apparatus and more specifically to devices for separating the cleaning agent from the exhaust air of dry cleaning machines.

The cycle of operation of dry cleaning machines includes loading, cleaning, drying, ventilating and unloading processes. Since the air exhausted from the machine during cleaning contains a high concentration of cleaning agent vapors, it is necessary to remove these vapors from the exhaust air before they are released to atmosphere.

German Auslegeschrift No. 2,011,300 discloses a device which effectively cleanses the exhaust by placing the outlet end of the exhaust air line in a cooled water purifier. The outlet end of the exhaust line is immersed in the water to force the exhaust gases through the cooled liquid thereby condensing the cleaning fluid vapors. An outlet line is connected to the purifier at a point above the water level and directs the exhaust gases through an end filter to atmosphere. Typically the dry cleaning machine has an exhauster which develops an over pressure in the air exhaust line to force the exhaust gases through the water purifier. The outlet line may also include an exhauster to draw the exhaust gases from the purifier and through the end filter.

While such separation devices effectively remove the cleaning agent vapors from the exhaust line, the throttling of the air exhaust line, or back pressure, developed in the line as a result of the water purifier creates various disadvantages during the opening and ventilating of the cleaning machine. For example, after the laundering is complete, and the loading door of the cleaning machine is opened, the exhaust air will pass into the room in which the machine is installed because of the over pressure condition prevailing in the interior of the cleaning machine. Further, during the ventilation process following the cleaning process, relatively high pressures must be maintained to force the exhaust air stream ventilating the laundry through the water purifier. Finally, because of these pressure problems, it is not feasible to connect the exhaust air lines of several cleaning machines to a common water purifier. Since the ventillation processes of each machine typically occur at different times, the relatively high pressure conditions attendant the ventilation of one machine will have an adverse effect on the pressure conditions in the exhaust air lines of other cleaning machines engaged in the cleaning process.

It is therefore a principal object of the invention to provide an improved cleaning agent separation device to eliminate the throttling of the air exhaust line by the water purifier during the ventilation process.

It is a further object of this invention to eliminate the internal over pressure in the cleaning machine shortly before opening the loading door to avoid forcing cleaning agent vapors into the room.

Yet another object of the invention is to provide a cleaning agent separation device that allows the air exhaust lines of several cleaning machines to be connected to a common water purifier without adversely affecting the operation of certain of those machines during their cleaning cycles due to pressure conditions occuring in exhaust air lines of other cleaning machines during their operating cycles.

SUMMARY OF THE INVENTION

The air exhaust line of a dry cleaning machine which communicates to atmosphere through a water purifier has a conduit with a control valve which connects the air exhaust line to an outlet line of the purifier. When the control valve is fully closed, the exhaust gases from the cleaning machine are forced to flow to atmosphere through the cool water of the purifier. When the control valve is opened, the exhaust gases can bypass the water purifier thereby presenting a greatly reduced back pressure to the interior of the cleaning machine. Preferably the outlet line includes an end filter. Also, the control valve is preferably operated automatically by the actuation of the cleaning machine loading door or the machine operation control program.

In a form of the invention where several cleaning machines are connected to a common water purifier, in addition to a bypass conduit and associated control valve connecting each exhaust line to the outlet line, the air exhaust lines are movable vertically within the water purifier to adjust the immersion depth of each exhaust line. Each line is adjustable separately independently of the others and preferably the adjustment is automatically controlled by a suitable servo mechanism.

These and other features and objects of the invention will be more fully understood from the following detailed description of the preferred embodiments which should be read in light of the accompanying drawings.

DETAILED DESCRIPTION OF THE PREFERRED EMBODIMENTS

Figure 1:
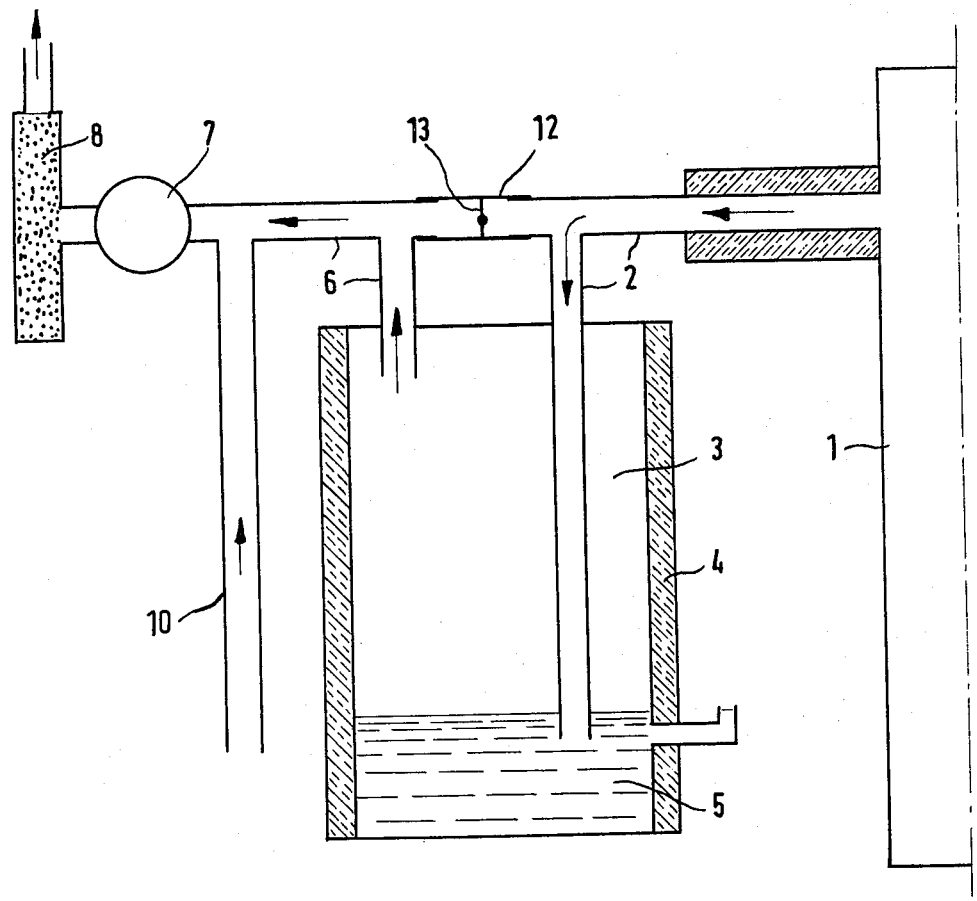
FIG. 1 is a schematic view, partly in section, of a separation device constructed according to the invention in which a single cleaning machine is connected to a water purifier apparatus.

With reference to FIG. 1 a dry cleaning machine 1 has an air exhaust line 2 which leads into a closed vessel 3 of a water purifier apparatus. During a drying cycle of the cleaning process, hot air is introduced into the dry cleaning machine 1. An exhauster (not shown) of standard design located at the cleaning machine outlet to the air exhaust line draws the hot air together with the vapors from the residual cleaning fluid and water vapors into the exhaust line. The drawing action of the exhauster generates a pressure in the exhaust line of approximately a 150 millimeter column of water. The outlet end of the exhaust air line 2 is immersed approximately 20 millimeters into cooled water 5 held in the closed vessel 3. A cooling jacket 4 surrounding the vessel 3 cools both the vessel and the water 5 held in the vessel. Further, the air exhaust line between the cleaning machine 1 and the vessel 3 can be enclosed by a cooling jacket.

An outlet 6 is connected to the vessel 3 so that it is in fluid communication with the space above the liquid 5. The outlet line 6 includes another exhauster 7 which forces dry air drawn out of the vessel 3 through an activated charcoal filter 8. The air escapes into the open atmosphere from the outlet line at the downstream side of the filter 8. The hot air drawn from the vessel 3 is cooled by mixing it with fresh air drawn into the outlet line through a ventillating duct 10.

A conduit or pipe 12 directly connects the exhaust air line 2 and the outlet line 6 at a point above the vessel 3. An adjustable throttle valve 13 is mounted in the connecting pipe 12. When the valve 13 is in a closed position (as shown in FIG. 1) then the exhaust air from the cleaning machine must flow through the vessel 3 and the water 5 to reach the outlet line 6. If, on the other hand, the valve 13 is in an open position, then the exhaust air can flow directly from the line 2 into the outlet line 6 thereby bypassing the vessel 3 and the water purifier 5. In the latter case, the exhaust air from the dry cleaning machine must overcome only the relatively small flow resistance of the charcoal filter 8. In operation, the throttle valve 13 is open when there are no cleaning vapors, or virtually none, left in the exhaust air such as the case during the process of ventilation the cleaning machine 1.

Figure 2:
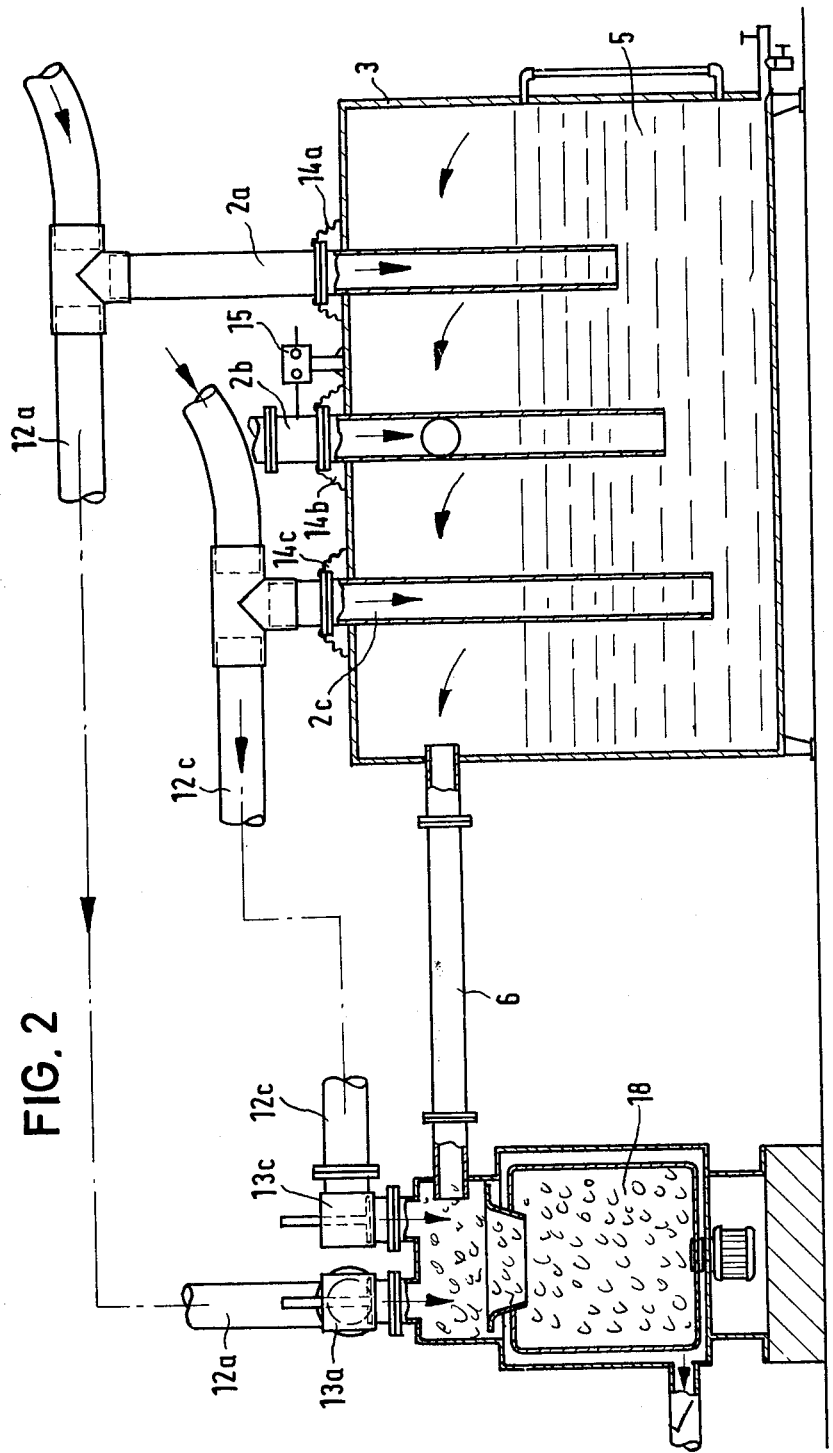
FIG. 2 is a schematic view, partly in section, of a separation device constructed according to the invention in which several cleaning machines are connected to a single water purifier apparatus.

FIG. 2 illustrates an embodiment of the invention in which three cleaning machines (not shown) are connected to the vessel 3 with the cool water 5 by air exhaust lines or pipes 2a, 2b and 2c. These exhaust lines are passed through holes in the cover of the vessel 3 and are vertically displaceable with respect to the cover. Resilient members 14a, 14b and 14c seal the exhaust lines 2a, 2b and 2c, respectively, to the cover of the vessel 3. Vertical displacement of the exhaust lines 2a, 2b and 2c is achieved either manually or by a motor such as a servo motor 15. If a servo motor is used, it is necessary to have a separate motor associated with each exhaust line. The immersion depths of the lines 2a, 2b and 2c are determined by the size of the associated cleaning machines and the pressure conditions prevailing in them. The proper immersion depth for each pipe can be determined either by calculation or empirically by observation and adjustment.

Each exhaust air line 2a, 2b and 2c is connected to an outlet separator 18 through a connecting conduit or pipe 12a and 12c (a connecting conduit associated with the exhaust line 2b is not illustrated in FIG. 2 for the sake of clarity). Valve 13a and 13c which correspond in junction to the throttle valve 13 shown in FIG. 1 are mounted in the connecting conduits 12a and 12c. The outlet separator 18, in contrast to the end filter 8 in FIG. 1, is not an activated charcoal filter but rather a rotary centrifugal separator preferably the type disclosed in German Offenlegungschrift No. 2,303,403.

The separating device shown in FIG. 2 operates generally in the same manner as that shown in FIG. 1. It is essential, however, that the exhaust lines 2a, 2b and 2c be independently adjustable with respect to their depth of immersion into the water 5. It is also essential that the valves 13a and 13c also be independently controllable. This independence of action and control allows all three cleaning machines to be connected to a single water purifier without the disadvantages heretofore encountered due to differences in the size and the working cycle of the machines.

The invention as described in the foregoing detailed description and the accompanying drawings therefore provides a low pressure condition in the air exhaust line of a dry cleaning machine to prevent an overpressure condition in the machine from forcing cleaning agent vapors into the installation room when the door of the machine is opened and to eliminate the throttling of the exhaust line by the water purifier during the ventilation process. The invention also allows several cleaning machines of varying size and in various portions of their operating cycles to be connected to a common water purifier.

It will be understood that while the exhaust lines have been described as vertically movable with respect to the cover of the vessel 3, the desired variations of the immersion depth could be achieved by using exhaust lines having a telescoping structure. These and other modifications will become apparent to those skilled in the art from the foregoing descriptions and accompanying drawings. Such modifications are intended to fall within the scope of the appended claims.

What is claimed is:

1. A device for separating a cleaning agent from the exhaust air of a dry cleaning machine comprising in combination, a purifier having a closed vessel and a liquid held in said vessel, an exhaust line having one end in direct fluid communication with the dry cleaning machine and the other end immersed in said liquid, exhaust means for drawing the air and the cleaning agent from the dry cleaning machine through said exhaust line to said purifier, an outlet line having one end connected to and in fluid communication with said purifier at a point above said liquid and another end open to atmosphere, conduit means having one end connected to said exhaust air line at a point above said liquid and having its other end connected to said outlet line at a point intermediate its ends, means for controlling exhaust air flow through said conduit means, and a filter positioned in said outlet line between said conduit means and said open end.

2. A separation device according to claim 1 in which said conduit means is an connecting pipe and said controlling means is a throttle valve.

3. A separation device according to claim 1 further comprising at least one additional exhaust line, each of said at least one additional exhaust line having one end connected to a separate dry cleaning machine and having another end immersed in said liquid, each of said exhaust line and said at least one additional exhaust line being independently movable to adjust the immersion depth of the exhaust line and said at least one additional exhaust line in the liquid, and one additional conduit means having one end connected to said at least one additional exhaust air line at a point above said liquid and having its other end connected to said outlet line at a point intermediate its end and one additional control means connected to each of said at least one additional exhaust lines.

4. A device according to claim 3 in which said exhaust line and said at least one additional exhaust line are supported in openings formed in said vessel and further comprising resilient members that seal said vessel to said exhaust air line and said at least one additional exhaust line at said openings.

5. A device according to claim 3 further comprising a rotary centrifugal separator connected to said outlet line between said conduit means and said open end.

* * * * *